N. M. ALBRIGHT.
POWER TRANSMISSION AND LUBRICATOR THEREFOR.
APPLICATION FILED MAR. 6, 1913.
1,102,709.
Patented July 7, 1914.
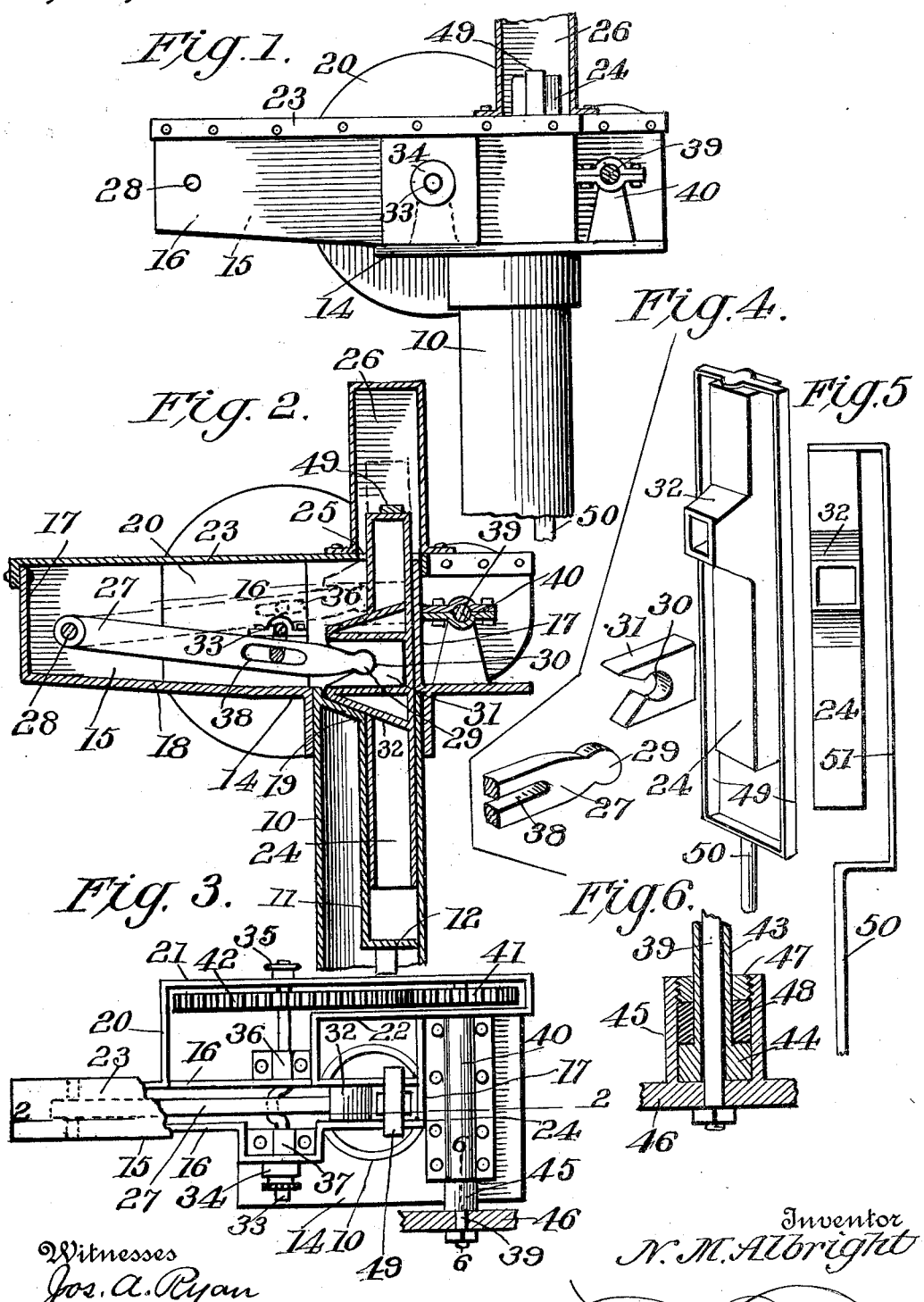
Witnesses
Jos. A. Ryan
Francis Boyle
Inventor
N. M. Albright
By 
Attorney

UNITED STATES PATENT OFFICE.

NOAH M. ALBRIGHT, OF WASHINGTON, DISTRICT OF COLUMBIA.

POWER TRANSMISSION AND LUBRICATOR THEREFOR.

1,102,709.  Specification of Letters Patent.  Patented July 7, 1914.

Application filed March 6, 1913. Serial No. 752,473.

*To all whom it may concern:*

Be it known that I, NOAH M. ALBRIGHT, a citizen of the United States, residing at Washington, in the District of Columbia, have invented certain new and useful Improvements in Power Transmissions and Lubricators Therefor; and I do hereby declare the following to be a full, clear, and exact description of the invention, such as will enable others skilled in the art to which it appertains to make and use the same.

This invention relates to windmills and has for an object to provide a windmill head in the nature of an oil-tight housing containing the power transmitting parts, which housing is supplied with an initial quantity of lubricant that is continuously supplied to said parts and is used over and over again.

A further object is to provide an extremely simple power transmission mechanism for transmitting power from the windwheel to the pump rod.

A still further object is to obviate the pump rod emerging from the housing below the oil level, by connecting the pump rod to the power transmitting mechanism above the oil level, such connection being housed by a hood which prevents access of water to the interior of the housing.

With the above objects in view the invention consists of certain novel details of construction and combination of parts hereinafter fully described and claimed, it being understood that various modifications may be made in the minor details of construction within the scope of the appended claims.

In the accompanying drawing illustrating this invention: Figure 1 is a side elevation. Fig. 2 is a longitudinal sectional view showing the power transmitting parts in full lines in one position and in dotted lines in another position. Fig. 3 is a plan view with portions of the cover removed to expose the interior of the head. Fig. 4 is a detail perspective view showing parts of the power transmitting mechanism. Fig. 5 is a front elevation of a modified form of pump rod attaching means. Fig. 6 is a fragmentary sectional view taken on the line 6—6 Fig. 3.

Referring now to the drawing in which like characters of reference designate similar parts, the windmill head is shown to comprise a tube 10 which is provided on the inner wall with a longitudinal casing 11 that is closed at the bottom end as shown at 12.

A marginal flange 14 projects from the top edge of the tube 10, and formed integral with this flange is a horizontal straight elongated casing 15 that extends at one end beyond the edge of the flange, and at the opposite end extends across the mouth of the tube. This casing comprises vertical side walls 16 connected by vertical end walls 17 and a bottom 18, the latter terminating at the casing 11 so that the casing 15 communicates with the casing 11 through an opening 19.

The casing 15 is formed with an L-shaped lateral branch 20 which forms a gear case, the outer and inner vertical walls 21 and 22 of which rise from the flange 14 to the height of the vertical walls of the casing 15. A cover 23 closes the casing 15 and the lateral branch 20 thereof. The casing 11 in the tube 10, the casing 15, and the lateral branch 20 thereof, all coact in producing inter-communicating chambers of a lubricant well which is supplied with an initial quantity of lubricant, this lubricant being used over and over again without waste to lubricate the power transmission mechanism about to be described. A vertically reciprocating hollow stand link 24 is slidably fitted at the lower end in the casing 11, and projects at the upper end through an opening 25 in the cover, a hood 26 being disposed on the cover and housing the top of the link. A rock link 27 is pivoted at one end as shown at 28 to the side walls at the outer end of the casing 15 and is provided at the opposite end with a journal portion 29 which fits in a socket 30 formed in a slide 31 that is fitted in a guide boxing 32 formed integral with the stand link. The stand link is thus operatively connected to the rock link so that when the former is rocked the stand link will be reciprocated.

A crank shaft 33 is journaled at the ends in stuffing box bearings 34 and 35 on the outer side walls of the lubricant well and is further journaled in bearings 36 and 37 disposed on the flange 14, the crank of this shaft engaging in a longitudinal slot 38 formed in the rock link. A driving shaft 39 is journaled in a bearing 40 disposed on the flange 14 outside of the lubricant well, the shaft projecting into the crank case 20 and being there equipped with a gear 41 which meshes with a gear 42 on the crank shaft.

The driving shaft 39 is incased in a tube 43 which projects or extends through the bearing 40 and terminates in a head 44 that receives the hub 45 of a wind wheel 46, a follower ring 47 being threaded into the hub and compressing a packing ring 48 against the head 44 to form a stuffing box which prevents escape of lubricant, the lubricant being carried by the gears 42 and 41 and running down the sides of the latter into the tube 43 to lubricate the shaft 39. This hub 46 may be secured to the shaft 39 in any of the well known manners, as for instance, it may be made to driving fit on said shaft and thus require no keys.

As illustrated, the driving shaft 39 rotates the crank shaft 33 and the latter rocks the rock link 27 with a resultant reciprocating of the stand link 24. An oblong frame 49 is fixed at the upper end to the top of the stand link and has the sides extending down along the stand link outside of the casing 15 and projecting through the tube 10, the bottom of the frame being secured to the top of the pump rod 50. As a modification, the pump rod 50 may be equipped with an offset portion 51 which projects through the tube 10 and is secured to the top of the stand link 24.

From the above description it will be seen that all of the power transmitting mechanism is constantly acted upon by a lubricant bath, so that lubrication of the parts need not be manually attended to after initially supplying the lubricant well with lubricant. It will further be seen that by virtue of the lubricant well being practically oil-tight, leakage of the lubricant therefrom will be prevented so that the lubricant will be used over and over again without waste.

What is claimed, is:—

1. In a power transmission, a casing, a second casing communicating with the first casing, a bar slidable in the second casing, means disposed in the first casing and connected to the bar for reciprocating the same, means for connecting the bar to a pump rod, said means being disposed exteriorly of the casings, and said casings coacting to form a lubricant well.

2. In a power transmission, a casing, a second casing communicating with the first casing, a bar slidable in the second casing and extending above the casings, a rock link pivoted in the first casing and engaging the bar to reciprocate the same, actuating means for the rock link disposed in the first casing and said casings coacting to form a lubricant well.

3. In a power transmission, a casing, a vertical second casing communicating therewith, a bar slidable in the second casing and extended thereabove, means carried within the first casing and engaging the bar for reciprocating the same and a rod extending laterally from the bar and directed downwardly parallel thereto and exteriorly of the casings.

4. In a power transmission device, an oil tight casing, a sleeve extending from said casing and provided at its free end with a peripheral flange, a shaft rotatable in the sleeve and extending therebeyond, a hub member fixed to the free end of the shaft, a cup formed on said hub member and receiving the flanged end of the sleeve, a follower ring on the sleeve threadedly engaging the outer end of the cup and packing disposed in the cup between the ring and the flange of the sleeve.

5. In a power transmission device, an oil carrying casing, a vertically movable bar supported by the casing, a transverse boxing carried by the intermediate portion of the bar, a block slidable in the boxing, a rock link having its free end pivotally connected to the block, and means for rocking the link.

6. In a power transmission device, a casing forming an oil well, a vertically movable bar carried for such movement by the casing, a transverse boxing carried by the intermediate portion of the bar, a block slidable in the boxing, the block being provided with a keyhole slot, the sides of the shank portion of the slot diverging outwardly and extending to the outer end of the block, a second oil carrying casing communicating with the first, a rock link in the second casing provided with a reduced end portion, a curved head on said end portion fitting in the curved portion of the slot, and means for actuating the rock link and thus reciprocating the bar.

7. A windmill head including a tube, a flange located at the top thereof, a straight casing on said flange, an L-shaped branch casing on said flange communicating with said straight casing, a longitudinal casing in said tube communicating with said straight casing, said straight casing said branch casing and said longitudinal casing forming oil-tight intercommunicating lubricant chambers, a driving shaft projecting into said branch casing, a crank shaft projecting into said branch casing, an operative connection between said driven shaft and said crank shaft, a rock link in said straight casing connected to and actuated by said crank shaft, and a vertically reciprocating pump rod actuating link in said longitudinal casing and connected to said rock link.

In testimony whereof, I affix my signature, in the presence of two witnesses.

NOAH M. ALBRIGHT.

Witnesses:
 HELEN ROPHAM,
 FRANCIS BOYLE.

Copies of this patent may be obtained for five cents each, by addressing the "Commissioner of Patents, Washington, D. C."